United States Patent
Tung et al.

(10) Patent No.: US 7,515,239 B2
(45) Date of Patent: Apr. 7, 2009

(54) LIQUID CRYSTAL DISPLAY SHEET

(75) Inventors: Jen-Lang Tung, Kaohsiung (TW);
Ya-Chieh Chen, Hsinchu (TW)

(73) Assignee: Au Optronics Corp., Hsin-Chu (TW)

( * ) Notice: Subject to any disclaimer, the term of this patent is extended or adjusted under 35 U.S.C. 154(b) by 359 days.

(21) Appl. No.: 11/553,015

(22) Filed: Oct. 26, 2006

(65) Prior Publication Data

US 2008/0036956 A1 Feb. 14, 2008

(30) Foreign Application Priority Data

Aug. 14, 2006 (TW) .............................. 95129812 A

(51) Int. Cl.
*G02F 1/1345* (2006.01)
*G02F 1/1343* (2006.01)

(52) U.S. Cl. ..................... 349/149; 349/151; 349/152; 345/204

(58) Field of Classification Search ................ None
See application file for complete search history.

(56) References Cited

U.S. PATENT DOCUMENTS

| 6,043,971 | A | * | 3/2000 | Song et al. ................. 361/111 |
| 6,724,458 | B2 | | 4/2004 | Kim et al. |
| 2003/0067579 | A1 | | 4/2003 | Inoue et al. |
| 2003/0162317 | A1 | | 8/2003 | Tanaka et al. |
| 2004/0169790 | A1 | | 9/2004 | Inoue et al. |
| 2004/0246404 | A1 | | 12/2004 | Elliott et al. |
| 2005/0122462 | A1 | * | 6/2005 | Park ........................... 349/149 |
| 2005/0237466 | A1 | * | 10/2005 | Chung et al. ................ 349/143 |

FOREIGN PATENT DOCUMENTS

| CN | 1439921 | 9/2003 |
| CN | 1696774 | 11/2005 |
| JP | 05341246 | 12/1993 |

* cited by examiner

*Primary Examiner*—Tina M Wong
(74) *Attorney, Agent, or Firm*—Thomas, Kayden, Horstemeyer & Risley

(57) ABSTRACT

A liquid crystal display (LCD) sheet comprising a first and a second substrates, and a liquid crystal (LC) layer is provided. The second substrate comprises several voltage-applying regions, a first input circuit, a first and a second wires, a first and a second panel input pads. Each voltage-applying region has several panel regions. The first input circuit is disposed in each voltage-applying region, and comprises a first and a second sheet input pads. The first and the second wires are both disposed in each of the voltage-applying regions, and are electrically connected to the first and the second sheet input pads, respectively. The first and the second panel input pads are disposed in each of the panel regions, and are electrically connected to the first and the second wires, respectively. The LC layer is disposed between the first and the second substrates, and is positioned in the panel region.

11 Claims, 4 Drawing Sheets the LCD sheet is divided into a number of single LCD panels.

LIQUID CRYSTAL DISPLAY SHEET

This application claims the benefit of Taiwan application Serial No. 95129812, filed Aug. 14, 2006, the subject matter of which is incorporated herein by reference.

BACKGROUND OF THE INVENTION

1. Field of the Invention

The invention relates in general to a liquid crystal display (LCD) sheet, and more particularly to an LCD sheet capable of applying polymer stabilization alignment (PSA) technology to each of the LCD panels at the same time.

2. Description of the Related Art

With the advance in technology, liquid crystal display (LCD) panel has been widely applied in various electronic products such as TV, computer screen, notebook computer, mobile phone and personal digital assistant (PDA). The polymer-stabilized alignment (PSA) technology for manufacturing the multi-domain alignment type LCD panel is particularly valued due to the features of short response time, wide view-angle, high aperture ratio, high contrast and simple manufacturing process.

According to the PSA technology for manufacturing a display panel, a small amount of reactive monomers are added to the liquid crystal (LC) layer disposed between the first substrate and the second substrate, such that the liquid crystal molecules are mixed with the reactive monomers. Next, when voltage and ultra-velvet (UV) light are applied onto the first substrate and the second substrate, the reactive monomers are separated from the liquid crystal molecules to form polymers on the surface of the first substrate and the second substrate. When the polymers on the LC layer are stacked towards the interface between the first substrate and the second substrate, the polymers are stacked along the direction of the liquid crystal molecules direction due to the interaction between the polymers and the liquid crystal molecules. Thus, the liquid crystal molecules must have a pre-tilt angle in a particular direction.

It is noted that according to conventional polymer-stabilized alignment technology, manufacturing process such as voltage-applying and exposure are applied to each of the LCD panels respectively after the LCD sheet is divided into a number of single LCD panels.

SUMMARY OF THE INVENTION

It is therefore an object of the invention to provide a liquid crystal display (LCD) sheet. According to the LCD sheet of the invention, the manufacturing costs are reduced, the alignment processing can be applied to the LCD sheet directly, furthermore, the alignment processing can be applied at the same time with the sealant hardening processing during the one-drop fill (ODF) manufacturing process so as to shorten the manufacturing time. Moreover, the invention avoids large variance existing among the LCD panels of the LCD sheet caused by the deformation of wave due to the load of the wire when the voltage is increased during the PSA manufacturing process of the LCD sheet. Furthermore, the invention avoids the non-panel region of the LCD sheet having discharge occurring when the gap between the top substrate and the bottom substrate is too small. Besides, the LCD sheet of the invention has a variety of voltage-applying regions, and the other voltage-applying regions can be used as a back-up when one of the voltage-applying regions fails to function properly.

The invention achieves the above-identified object by providing an LCD sheet comprising a first substrate, a second substrate and at least a liquid crystal (LC) layer. The second substrate is disposed in parallel to the first substrate, and comprises a number of voltage-applying regions, a first input circuit, a first wire, a second wire, a first panel input pad and a second panel input pad. Each of the voltage-applying regions comprises a number of panel regions. The first input circuit is disposed in each of the voltage-applying regions, and comprises a first sheet input pad and a second sheet input pad. The first wire and the second wire are disposed in each of the voltage-applying regions, and are electrically connected to the first sheet input pad and the second sheet input pad, respectively. The first panel input pad and the second panel input pad are disposed in each of the panel regions, and are electrically connected to the first wire and the second wire, respectively. At least an LC layer is disposed between the first substrate and the second substrate and correspondingly positioned on the panel region.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1A:
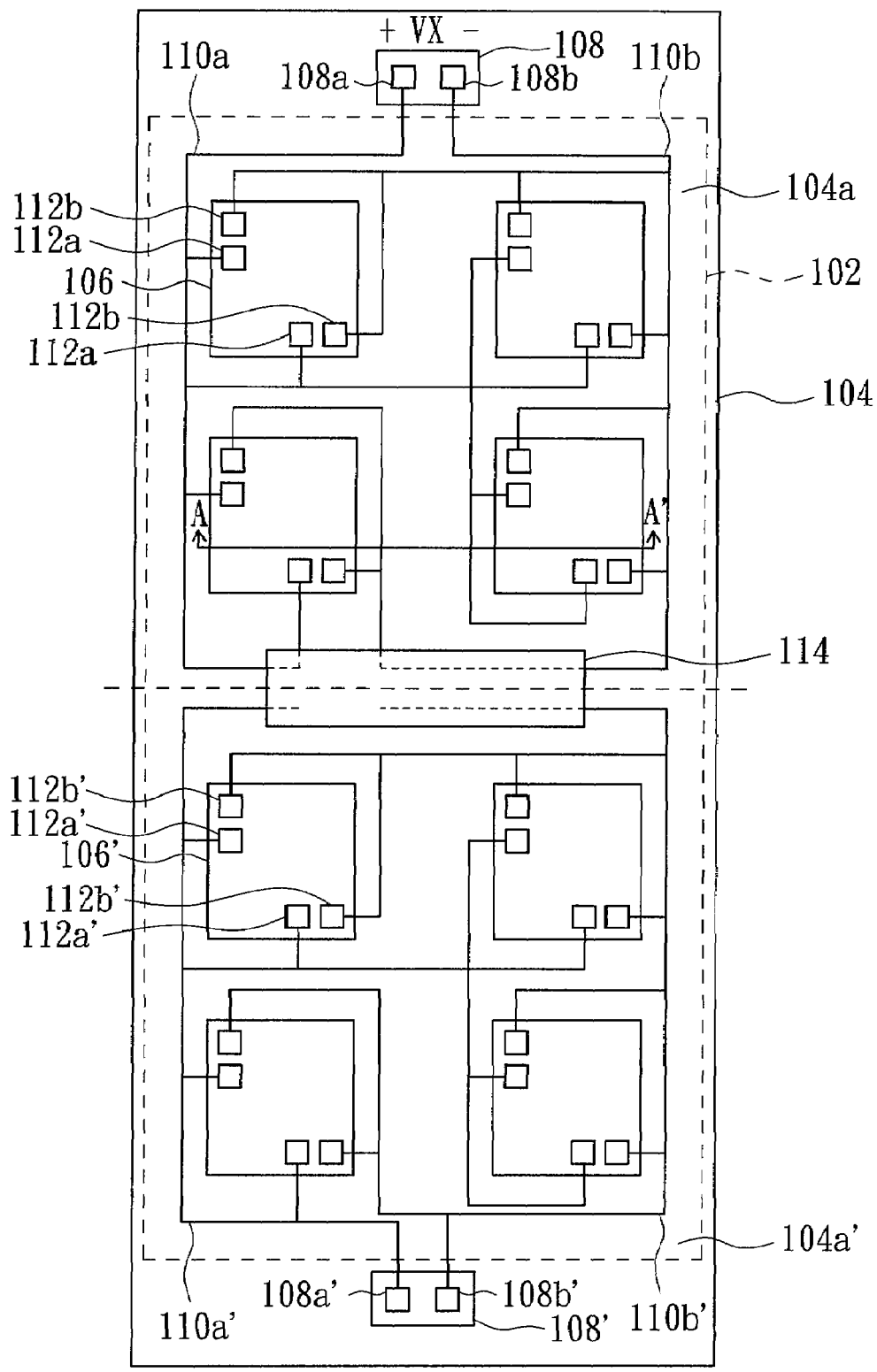
FIG. 1A shows a top view of an LCD sheet according to a first embodiment of the invention.
Figure 1B:
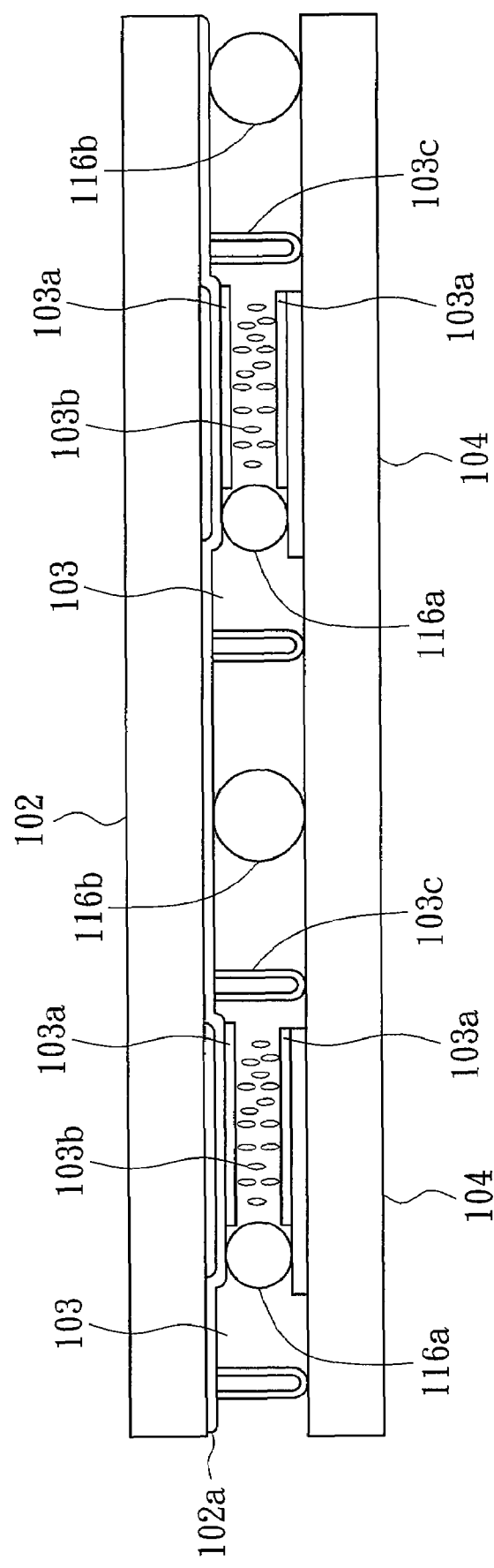
FIG. 1B shows a cross-sectional view along the cross-section line A A' of FIG. 1A.
Figure 1C:
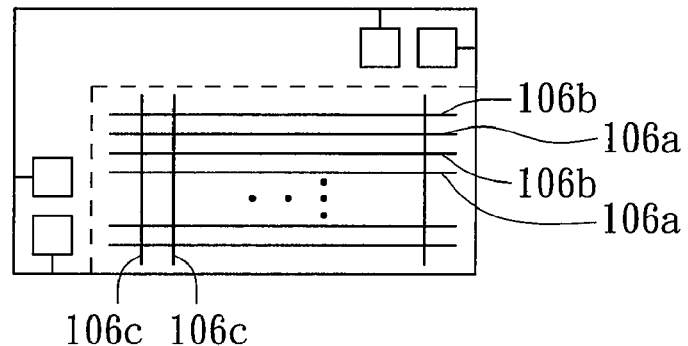
FIG. 1C shows a detailed top view of panel regions of FIG. 1A.

Referring to FIG. 1A, FIG. 1B and 1C. FIG. 1A shows a top view of an LCD sheet according to a first embodiment of the invention. FIG. 1B shows a cross-sectional view along the cross-section line AA' of FIG. 1A. FIG. 1C shows a detailed top view of panel regions of FIG. 1A. The liquid crystal display (LCD) sheet 100 comprises a first substrate 102, a second substrate 104 and at least a liquid crystal (LC) layer 103. The second substrate 104 is disposed in parallel to the first substrate 102, and comprises two voltage-applying regions 104a and 104a', two input circuits 108 and 108', four wires 110a, 110b, 110a' and 110b' and four panel input pads 112a, 112b, 112a' and 112b'.

In the present embodiment of the invention, the voltage-applying regions 104a and 104a' of the LCD sheet 100 have panel regions 106 and 106', respectively. The panel region 106 of the voltage-applying region 104a is electrically connected via the wires 110a and 110b. The panel region 106' of the voltage-applying region 106' is electrically connected via the wires 110a' and 110b'. The present embodiment of the invention is exemplified by disposing one input circuit 108 in the voltage-applying region 104a. The resistances of the wire 110a, 110b, 110a' and 110b' are substantially the same. The voltages applied via the sheet input pads 108a to panel input pads in panel regions may be the same.

The input circuit 108 is disposed in the voltage-applying regions 104a and comprises two sheet input pads 108a and 108b. The wires 110a and 110b are disposed in the voltage-applying region 104a and are electrically connected to the sheet input pads 108a and 108b, respectively. The panel input pads 112a and 112b are disposed in each of the panel regions 106 and are electrically connected to the wires 110a and 110b, respectively. Thus, the panel input pads 112a and 112b are electrically connected to the sheet input pads 108a and 108b, respectively. In the present embodiment of the invention, each of the panel regions 106 is exemplified by having two sets of panel input pads 112a and 112b, however, the design of two panel input pads 112a and 112b is also applicable. The LC layer 103 is disposed between the first substrate 102 and the second substrate 104 and correspondingly positioned in the panel region 106. In another panel region 106, the LC layer can be disposed between the first substrate 102 and the second substrate 104. The number of the sheet input pads and the number of the panel input pads are determined according to actual needs and are not for limiting the present embodiment of the invention.

The first substrate 102 further comprises a common electrode 102a. The second substrate 104 further comprises a number of electrode lines 106a, scan lines 106b and data lines 106c. The electrode lines 106a are disposed in the panel region 106 in parallel, and are electrically connected to the wire 110b. The scan lines 106b are disposed in the panel region 106 in parallel, and are parallel to and alternate with two neighboring electrode lines 106a. The data lines 106c are also disposed in the panel regions 106 in parallel, and are perpendicular to and crisscross with the electrode lines 106a and the scan lines 106b. A pixel is defined by any two neighboring scan lines 106b and any two neighboring data lines 106c. Each of the pixels comprises a thin-film transistor, a pixel electrode and a storage capacitor. The three ends of the thin-film transistor are correspondingly electrically connected to a data line of a pixel edge, a scan line of a pixel edge and a pixel electrode. In the present embodiment of the invention, the panel input pad 112b in the panel region 106 is electrically connected to the electrode line 106a, wherein the electrode lines 106a are an electrode structure of a storage capacitor, and the panel input pad 112a is electrically connected to the common electrode 102a via the conductive structure (such as a conductive ball) disposed between the first substrate 102 and the second substrate 104. That is, the electrode lines 106a is electrically connected to the sheet input pad 108b, and the common electrode 102a is electrically connected to the sheet input pad 108a.

The LCD sheet 100 further comprises a number of polymer layers 103a. Before the polymer-stabilized alignment (PSA) process is applied to the LCD sheet 100 of the present embodiment of the invention, the LC layer 103 comprises a monomer (not illustrated) and a number of liquid crystal molecules 103b. The monomer is mixed with the liquid crystal molecules 103b. Next, a cross-voltage Vx is provided on the voltage-applying region 104a via the sheet input pads 108a and 108b for increasing voltage to the first substrate 102 and the second substrate 104 to rotate the liquid crystal molecules 103b. After the exposure by ultra-velvet light during the voltage-applying period, the monomers are polymerized to form a polymer layer 103a on the surface of the first substrate 102 and the surface of the second substrate 104 such that the polymer layer 103a contacts the LC layer 103 and provides a pre-tilt angle to the liquid crystal molecules 103b. There is a sealant 103c disposed between the first substrate 102 and the second substrate 104 and around the LC layer 103 for bonding the first substrate 102 and the second substrate 104 together.

The layout of the wires 110a and 110b is exemplified below but is not for limiting the technology of the present embodiment of the invention. For example, the wire 110a and 110b are not interlacing with each other on the same layer or even by one layer apart to prevent the wires 110a and 110b from having short-circuit caused by the particles or fiber alight on the LCD sheet 100.

The panel region 106 also has a spacer 116a for enabling the first substrate 102 and the second substrate 104 to maintain a fixed cell gap in the panel region 106. The voltage-applying region 104a also has a spacer 116b disposed on the non-panel region between the panel regions 106 for enabling the first substrate 102 and the second substrate 104 to maintain a cell gap in the non-panel region. Thus, the dielectric between the common electrode 102a and the wire 110b will not collapse when the cell gap between the common electrode 102a and the wire 110b is too close and the resulted electrical field is too strong. Also, the common electrode 102a and the wire 110b are prevented from having short-circuits caused by the particles alight in the non-panel region. In the present embodiment of the invention, the spacers 116a and 116b are comprised of sealant, fiber, silica ball, photo spacer or a combination thereof.

As for the connection between the voltage-applying region 104a', the panel regions 106', the sheet input pads 108a' and 108b', the panel input pads 112a' and 112b', and the wires 110a' and 110b' is the same with the above disclosed connection between the voltage-applying region 104a, the panel region 106, the sheet input pads 108a and 108b, the panel input pads 112a and 112b, and the wires 110a and 110b, and is not repeated here. The design or layout of voltage-applying regions 104a and 104a' may be the same or different from each other. For example, the position and number of the panel region of the voltage-applying regions 104a and 104a', the layout of the wire, and the position and number of the panel input pads may be the same or different from each other.

The present embodiment of the invention is exemplified by dividing the LCD sheet 100 into two voltage-applying regions 104a and 104a'. However, the LCD sheet 100 of the present embodiment of the invention divides the voltage-applying regions with reference to the load of the wires 110a, 110b, 110a' and 110b'. If the length of the wires 110a, 110b, 110a' and 110b' is too long and the load is too large, the LCD sheet 100 of the present embodiment of the invention may be divided into more voltage-applying regions, such as three or more than three voltage-applying regions for example. By doing so, the load of the wires 112a, 112b, 112a' and 112b' is reduced, and the voltages applied to the two ends of the LC layer 103 disposed in the panel regions of each of the voltage-applying regions are even closer, such that the liquid crystal molecules 103b in each LC layer 103 achieve similar alignment effect. Thus, the LCD sheet 100 of the present embodiment of the invention can effectively avoid the voltage inputted to each of the LC layers 103 having large variance when the wire load is different and also avoid large variance in the outcome of the PSA manufacturing process of each LC layer 103.

Figure 1D:
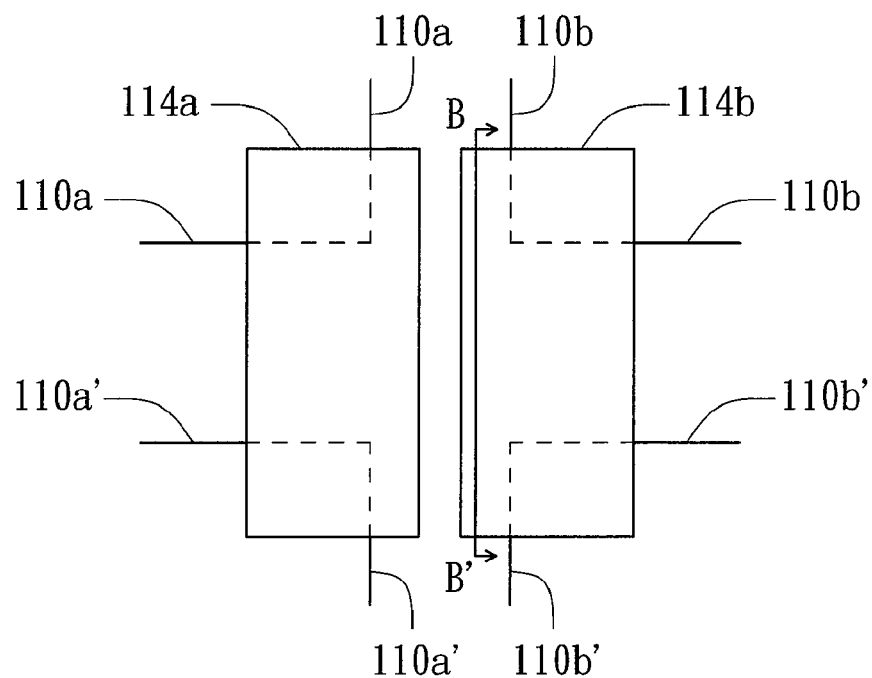
FIG. 1D shows a top view of a repair structure of FIG. 1A.
Figure 1E:
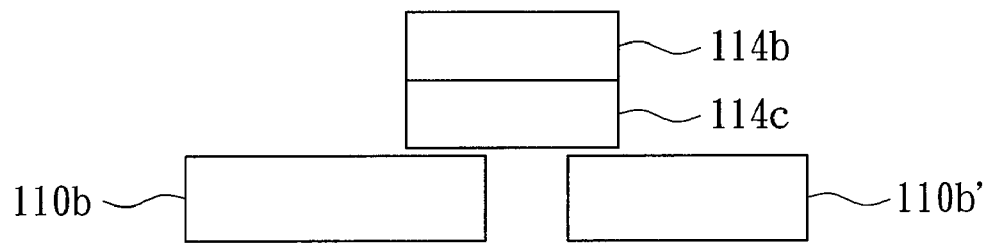
FIG. 1E shows a cross-sectional view along the cross-section line BB' of FIG. 1D.

The second substrate 104 of the present embodiment of the invention further comprises a repair structure 114. As indicated in FIG. 1A, the repair structure 114 is positioned between the voltage-applying regions 104a and 104a'. Referring to FIG. 1D and FIG. 1E. FIG. 1D shows a top view of a repair structure of FIG. 1A. FIG. 1E shows a cross-sectional view along the cross-section line BB' of FIG. 1D. The repair structure 114 comprises two conductive layers 114a and 114b and an insulating layer 114c. The insulating layer 114c covers the wires 110a and 110b of the voltage-applying region 104a as well as the wires 110a' and 110b' of the voltage-applying regions 104a'. The conductive layer 114a crosses over and is disposed on the insulating layer 114c, and correspondingly covers the wires 110a and 110a' by one layer apart. The conductive layer 114b also crosses over and is disposed on the insulating layer 114c, and correspondingly covers the wires 110b and 110b' by one layer apart.

When any of the input circuits 108 and 108' is damaged or any of the wires 110a, 110b, 110a' and 110b' is broken, the operator can damage the structure of the insulating layer 114c by Laser (for example, hollow the structure and then fill the hole with conductive material) for enabling the conductive layer 114a to be electrically connected to the wires 110a and 110a' and enabling the conductive layer 114b to be electrically connected to the wires 110b and 110b'. Thus, the non-damaged input circuit is used to apply voltage to the voltage-applying region of the damaged input circuit. The present embodiment of the invention is exemplified by a cross-sectional structure of the repair structure 114 at the conductive layer 114b. However, the cross-sectional structure of the repair structure 114 at the conductive layer 114a can be derived with reference to the cross-sectional structure of the cross-sectional structure of the repair structure 114 at the conductive layer 114b.

The present embodiment of the invention is exemplified by the design that the voltage-applying region 104a comprises an input circuit 108. However, the voltage-applying region 104a can comprise two or more input circuits, such that when one of the input circuits 108 is damaged, the other input circuit can be used as a backup to apply voltage to the voltage-applying region 104a. The present embodiment of the invention is exemplified by the voltage-applying region 104a. However, the structure and operation of the voltage-applying regions 104a' can be derived with reference to the structure and operation of the voltage-applying region 104a. The present embodiment of the invention is exemplified by the design of disposing two panel input pads 112a and 112b on each panel region 106. However, the number of the panel input pads disposed on each panel region 106 is not limited to the number exemplified in the present embodiment of the invention, and one panel input pad would also do.

According to the LCD sheet of the present embodiment of the invention, the TFT substrate is divided into a number of voltage-applying regions, and a repair structure is disposed between two neighboring voltage-applying regions. Unlike the conventional PSA manufacturing technology which can only apply the PSA manufacturing process to an LCD panel at a time, not only taking longer time but also occupying larger space in the dust-free room, the PSA manufacturing process according to the present embodiment of the invention can be applied to multiple LCD panels of the LCD sheet at the same time, hence effectively resolving the problems occurring to the conventional PSA manufacturing technology. According to the LCD sheet of the invention, the wires do not interlace with each other and spacers are disposed on the non-panel region during the PSA manufacturing process, in other words, spacers are disposed on the non-displaying regions, such that the PSA manufacturing process can be applied to multiple LCD panels of the LCD sheet at the same time. The LCD sheet of the present embodiment of the invention further has the following advantages: the PSA manufacturing process for each of the LC layers has similar results and achieves better effect, the wire does not go short-circuiting easily, and when the wire short-circuits or the input circuit is damaged during the PSA manufacturing process, the PSA manufacturing process can be resumed by using a repair structure.

Second Embodiment

Figure 2:
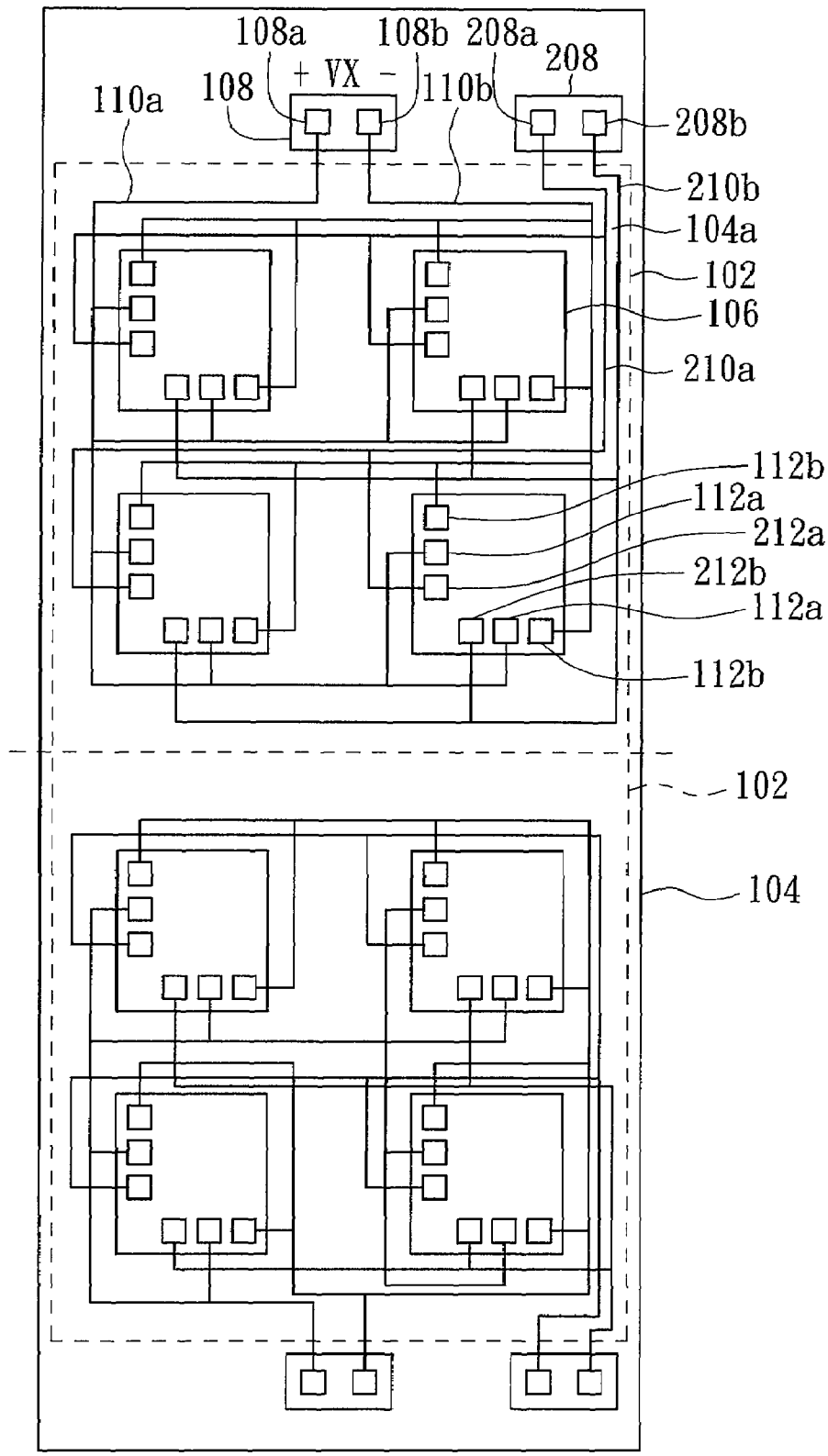
FIG. 2 shows a top view of an LCD sheet according to a second embodiment of the invention.

Referring to FIG. 2, a top view of an LCD sheet according to a second embodiment of the invention is shown. The present embodiment of the invention differs with the first embodiment in that the LCD sheet 200 of the present embodiment of the invention further comprises an input circuit 208, a gate panel input pad 212a, a source panel input pad 212b, and two wires 210a and 210b. The input circuit 208 comprises a gate sheet input pad 208a and a source sheet input pad 208b. In each panel region 106, the gate panel input pad 212a and the source panel input pad 212b are electrically connected to the wire 210a and the wire 210b respectively, and are also electrically connected to the scan lines and the data lines, respectively. The gate sheet input pad 208a and the source sheet input pad 208b are electrically connected to the wire 210a and the wire 210b, respectively. That is, the gate panel input pad 212a is electrically connected to the gate sheet input pad 208a via the wire 211a, while the source panel input pad 212b is electrically connected to the source sheet input pad 208b via the wire 210b.

Thus, when the wires 108a and 108b are short-circuited, the LCD sheet 200 still can apply voltage to the voltage-applying region 104a via the sheet input pad 208a and 208b to continue the PSA manufacturing process. Therefore, the LCD sheet 200 of the present embodiment of the invention effectively resolves the problem occurring during the PSA manufacturing process of a conventional LCD sheet when the wire short-circuits and the PSA manufacturing process has to stop due to the lack of a backup voltage-applying device.

In the present embodiment of the invention, the wires 110a, 110b, 210a and 210b interlace by one layer apart, and have a number of interlacing points one layer apart. For the wires to interlace with each other by one layer apart, at least an insulating layer is disposed on the interlacing region. Preferably, the wires are electrically isolated to each other to avoid short-circuits. The present embodiment of the invention is further exemplified below by the structure of the wires 110a and the wire 210a.

Both the wires 210a and 110a are formed on the first metal layer. Normally, the first metal layer is the metal layer which forms the scan line or the metal layer forms the gate of a thin-film transistor, while any one of the wires 210a and 110a forms the second metal layer on the interlacing region. Normally, the second metal layer is the metal layer which forms the data line or the metal layer forms the source/drain of a thin-film transistor. There is an insulating layer disposed between the first metal layer and the second metal layer for enabling the first metal layer and the second metal layer to be electrically isolated and avoiding the short-circuit occurring between the wires 210a and 110a. The wires 210a and 110a can be respectively formed on the first metal layer and the second metal layer to avoid short-circuits occurring between the wires 210a and 110a. The present embodiment of the invention is exemplified by the structure of the interlacing region of the wires 210a and 110a. However, the structure of any two wires of the wires 210a, 210b, 110a and 110b can be derived with reference to the structure of the wires 210a and 211a.

According to the LCD sheet of the present embodiment of the invention, the second substrate is divided into a number of voltage-applying regions, and two sets of voltage input circuits and wires are disposed in each of the voltage-applying regions, such that when any of the two sets of voltage-applying circuits or wires is broken, the other set of voltage-applying circuit and wire is used as a backup to resume the PSA manufacturing process of the LCD sheet. Unlike the conventional PSA manufacturing technology which can only apply the PSA manufacturing process to an LCD panel at a time, not only taking longer time but also occupying larger space in the dust-free room, the PSA manufacturing process according to the present embodiment of the invention can be applied to multiple LCD panels of the LCD sheet at the same time, hence effectively resolving the problems occurring to the conventional PSA manufacturing technology. According to the LCD sheet of the invention, the wires do not interlace with each other and spacers are disposed on the non-panel region during the PSA manufacturing process, such that the PSA manufacturing process can be applied to multiple LCD panels of the LCD sheet at the same time. The LCD sheet of the present embodiment of the invention further has the following advantages: the PSA manufacturing process for each of the LC layers has similar results and achieves better effect, the wire does not go short-circuiting easily, and when the wire short-circuits during the PSA manufacturing process, the PSA manufacturing process can be resumed by using other wires as a backup.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) sheet, comprising:
   a first substrate;
   a second substrate, having a plurality of voltage-applying regions each comprising a plurality of panel regions, comprising:
      a first input circuit comprising a first sheet input pad and a second sheet input pad;
      a first wire disposed in one of the voltage-applying regions and electrically connected to the first sheet input pad;
      a second wire disposed in the one of the voltage-applying regions and electrically connected to the second sheet input pad;
      a first panel input pad disposed in one of the panel regions and electrically connected to the first wire; and
      a second panel input pad disposed in the one of the panel regions and electrically connected to the second wire; and
   a liquid crystal (LC) layer disposed between the first and the second substrates.

2. The LCD sheet according to claim 1, wherein the first substrate comprises:
   a common electrode electrically connected to the first panel input pad.

3. The LCD sheet according to claim 1, wherein the second substrate further comprises:
   a plurality of electrode lines disposed in each of the panel regions and electrically connected to the second panel input pad.

4. The LCD sheet according to claim 1, further comprising:
   a plurality of polymers disposed on at least one of the first and the second substrates and positioned in the LC layer.

5. The LCD sheet according to claim 1, wherein the voltage-applying regions comprise a first voltage-applying region and a second voltage-applying region, the second substrate further comprising:
   a repair structure, disposed between the first voltage-applying region and the second voltage-applying region, comprising:
      an insulating layer covering a portion of the first wire and a portion of the second wire in the first voltage-applying region and a portion of the first wire and a portion of the second wire in the second voltage-applying region;
      a first conductive layer disposed on the insulating layer and over the first wire in the first voltage-applying region and the first wire in the second voltage-applying region; and
      a second conductive layer disposed on the insulating layer and over the second wire in the first voltage-applying region and the second wire in the second voltage-applying region.

6. The LCD sheet according to claim 1, wherein the second substrate further comprises:
   a second input circuit disposed in another one of the voltage-applying regions and comprising a third sheet input pad and a fourth sheet input pad, wherein the third sheet input pad and the fourth sheet input pad are electrically connected to the first wire and the second wire, respectively.

7. The LCD sheet according to claim 1, wherein the first wire and the second wire are electrically isolated to each other without interlacing with each other on the same or by one layer apart.

8. The LCD sheet according to claim 1, wherein the second substrate further comprises:
   a plurality of scan lines and data lines disposed in each of the panel regions;
   a gate panel input pad and a source panel input pad disposed on each of the panel regions and electrically connected to the scan lines and the data lines, respectively;
   a third input circuit comprising a gate sheet input pad and a source sheet input pad;
   a third wire disposed electrically connected to the gate sheet input pad and the gate panel input pad; and
   a fourth wire electrically connected to the source sheet input pad and the source panel input pad.

9. The LCD sheet according to claim 1, further comprising:
   a plurality of spacers disposed between the first substrate and the second substrate.

10. The LCD sheet according to claim 9, wherein the spacer is comprised of sealant, fiber, silica ball, photo spacer or a combination thereof.

11. The LCD sheet according to claim 1, wherein a resistance of the first wire is substantially equal to that of the second wire.

* * * * *